United States Patent [19]

Tominaga et al.

[11] 4,305,896

[45] Dec. 15, 1981

[54] VENT EXIT DEVICE FOR CONDENSING STEAM

[75] Inventors: Kenji Tominaga; Toshihiko Sugisaki; Tetsuo Horiuchi; Syozo Yamanari, all of Hitachi, Japan

[73] Assignee: Hitachi, Ltd., Tokyo, Japan

[21] Appl. No.: 897,711

[22] Filed: Apr. 19, 1978

Related U.S. Application Data

[63] Continuation-in-part of Ser. No. 714,321, Aug. 13, 1976, abandoned.

[30] Foreign Application Priority Data

Sep. 5, 1975 [JP] Japan .................................. 50/107012

[51] Int. Cl.³ .............................................. B01F 3/04
[52] U.S. Cl. .................................. 376/283; 376/316; 376/293; 261/124
[58] Field of Search ............... 261/121 R, 122–124, 261/DIG. 10, DIG. 32, DIG. 33, DIG. 76; 176/38, 87, 37

[56] References Cited

U.S. PATENT DOCUMENTS

| 428,307 | 5/1890 | Leland | 261/124 X |
|---|---|---|---|
| 824,956 | 7/1906 | Smith | 261/124 X |
| 988,398 | 4/1911 | Stein | 261/124 X |
| 1,532,233 | 4/1925 | Dahlberg | 261/124 X |
| 1,957,615 | 5/1934 | Russell | 261/123 |
| 1,969,644 | 8/1934 | Gavett | 261/124 |
| 2,502,187 | 3/1950 | Wahlgren | 261/122 |
| 3,490,752 | 1/1970 | Danjes et al. | 261/124 X |
| 3,606,985 | 9/1971 | Reed | 261/124 |
| 3,899,391 | 8/1975 | Sulzer et al. | 176/38 X |
| 3,988,396 | 10/1976 | Stannard | 261/124 |
| 4,022,655 | 5/1977 | Gaouditz et al. | 261/124 X |

Primary Examiner—Richard L. Chiesa
Attorney, Agent, or Firm—Craig and Antonelli

[57] ABSTRACT

A device having a tubular body of an increased diameter closed at its bottom and connected at its top to the lower end of a vent pipe in such a state that the tubular body is immersed in a water pool. The tubular body is formed in its side wall with a multitude of openings for venting steam therethrough to the water pool to condense the same.

7 Claims, 1 Drawing Figure

VENT EXIT DEVICE FOR CONDENSING STEAM

CROSS REFERENCE TO RELATED APPLICATION

This is a Continuation-in-Part application of U.S. Ser. No. 714,321 filed on Aug. 13, 1976 now abandoned.

BACKGROUND AND SUMMARY OF THE INVENTION

This invention relates to vent exit devices for venting and condensing gases containing steam, and more particularly to a vent exit device for vent pipes which communicate a dry well with a suppression chamber and a pressure vessel with a suppression chamber in a water-moderated reactor of a nuclear plant.

In some boiling water reactors which are classified as water-moderated reactors, there is provided a primary containment vessel which completely shuts off the reactor from the atmosphere. The primary containment vessel is generally partitioned into upper and lower sections or a dry well in which a pressure vessel is encased and a suppression chamber in which ordinary water is stored. There are provided a plurality of vent pipes which extend through a floor partitioning the dry well from the suppression chamber, each of the vent pipes having its lower end immersed in the water in the suppression chamber. The vent pipes are thus capable of transferring steam, generated in the pressure vessel, to the water pool in the suppression chamber by virtue of differential pressure in the event that an accident involving leaks of steam occurs.

The steam contained in gases passing from the dry well to the water pool in the suppression chamber at the time of such accident is condensed in the water pool, thereby preventing damage to and destruction of the primary containment vessel due to a rise in pressure caused by the leaked steam.

The vent pipes also have another function. When the pressure in the pressure vessel in which a reactor core is encased is reduced at the time the nuclear reactor is shut down, it is possible to release the steam through the vent pipes by operating a relief vent valve, into the water pool where the steam can be condensed. One type of vent exit device of the prior art comprises a tubular member of the same diameter as the vent pipes, which is closed at the bottom and formed with a multitude of openings in the side wall of a portion of the device which is immersed in the water pool.

Generally, in the event that an accident involving leaks of steam from the pressure vessel occurs, the pressure in the dry well will abruptly rise. Under such condition, if the steam from the pressure vessel and the air in the vent pipes are vented to the water pool, dynamic loads as described in the following paragraphs (I) to (V) will be transiently produced and a situation resembling the occurrence of a tidal wave will be produced.

(I) When the venting of the steam is initiated, the water in the vent pipes will be ejected at high speed into the water pool by the compressed air in the vent pipes. The water jet force generated by the streams of water will be exerted as a dynamic force on the floor of the suppression chamber.

(II) The air compressed in the vent pipes at initial stages of venting of the steam containing air will expand simultaneously as the air is ejected into the water pool through the small openings in the side walls of the vent pipes. This will cause the vent pipes to vibrate. This phenomenon is referred to as a vent lateral load due to air bubble venting.

(III) If a large volume of air is released with a rush together with the leakage steam, the pressure of the air will be instantaneously applied to the floor of the suppression chamber as it is. This is referred to as a bubble formation pressure spike.

(IV) If the air pressurized as aforementioned at the time of initiation of venting of the steam containing air to the water pool through the vent pipes, the air will expand due to a sudden reduction in pressure. This will cause the water in the suppression chamber to move upwardly and this rise in the liquid level of the water pool will cause an upwardly directed force to be exerted on the structures in the upper portion of the primary containment vessel. This is referred to as a pool swell impact.

(V) At the time of an accident, if condensation of the steam takes place continuously and the temperature of the water pool rises, or if the volume of steam vented through the vent pipes increases, the condensation capabilities of the water pool will reach a critical state. In such case, the ejected steam will not be condensed at once, and the steam will be suddenly condensed after growing into bubbles of a substantial size. This phenomenon of growing of the steam into bubbles and then being suddenly condensed is repeated, thereby causing the exits of the vent pipes to vibrate. This phenomenon is referred to as a steam condensing vibration due to steam venting.

There are possibilities that the phenomena described in the above paragraphs (I and IV) occur during the process of venting gases through the relief vent valve when a nuclear reactor is shut down. The loadings that most strongly affect the installation are those which are described in paragraphs (I), (III) and (V).

The vent exit device of the prior art mentioned above is not capable of damping the dynamic forces generated when the phenomena described in paragraphs (I) to (V) occur. This makes it necessary to design the primary containment vessel by taking these phenomena into consideration. Thus the prior art device has the disadvantage of increasing the construction expenses of a nuclear plant.

This invention has as its object the provision of a vent exit device which is capable of effectively damping the dynamic loads which are produced when the steam is vented and condensed, whereby constructional expenses of a nuclear reactor can be reduced.

The present invention is based on the principle that, when steam containing gases is led to the water pool to condense the steam by venting the gases through conduits to the water pool, a portion of each of the conduits is enlarged, so that the gases can be dispersed widely in the water pool and the energy of the gases can be rapidly absorbed by the water pool.

According to the invention, there is provided a vent exit device comprising a first elongated pipe, a second pipe larger in diameter than the first pipe and essentially immersed in a water pool, an upper cover plate connecting these two pipes together in airtight relationship, a lower cover plate adapted to close an open end of the second pipe opposite the end thereof at which the upper cover plate is applied, and a multitude of openings formed in the second pipe.

BRIEF DESCRIPTION OF THE DRAWINGS

FIG. is a vertical sectional view of a boiling water nuclear reactor incorporating therein the vent exit device in accordance with this invention.

DESCRIPTION OF THE PREFERRED EMBODIMENT

One embodiment of the invention will now be described in detail with reference to the accompanying drawings.

Figure 1:
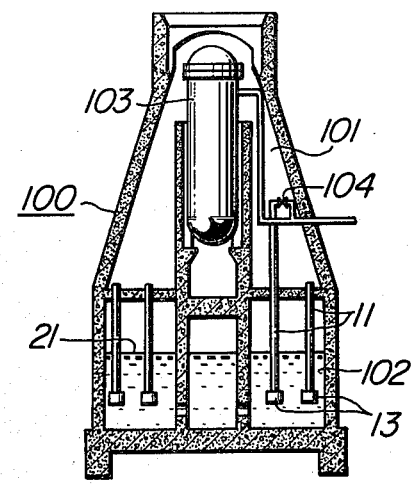

As shown in FIG. 1, the vent exit device in accordance with the invention is connected to the lower end of each of vent pipes 11 communicating a dry well 101, in which a pressure vessel 103 is encased, with a suppression chamber 102, in which ordinary water is stored in a pool, within a primary containment vessel 100 of a boiling-water nuclear reactor, for example. The vent exit device is bodily immersed in the water pool in the suppression chamber 102.

Figure 2:
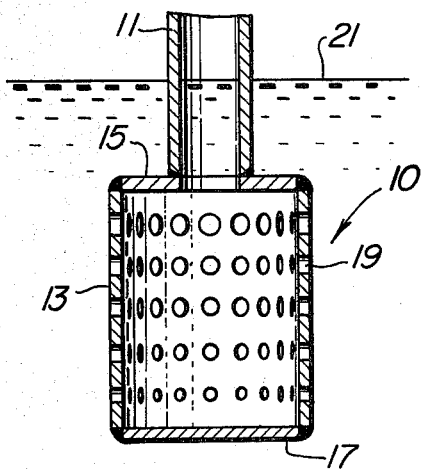
FIG. 2 is a vertical sectional view of the vent exit device comprising one embodiment of the invention.

In FIG. 2, the vent exit device is shown as comprising a tubular body 13 which is in the form of a hollow cylinder opening at its opposite ends. The tubular body 13, which is larger in diameter than the associated vent pipe 11, is formed in its side wall with a plurality of openings 19. One open end of the tubular body 13 is covered in airtight relationship with an upper cover plate 15 formed therein with a circular opening of the same diameter as the bore of the vent pipe 11. The tubular body 13 is secured to the lower end of the vent pipe 11 in such a manner that the bore of the vent pipe 11 is in alignment with the circular opening of the upper cover plate 15.

The vent pipe 11, upper cover plate 15 and tubular body 13 are airtightly joined to one another, as by welding, to form a unitary structure.

A lower cover plate 17 is also air-tightly joined, as by welding, to the other end of the tubular body 13 so as to close the bore thereof. The tubular body 13, upper cover plate 15, and lower cover plate 17 as a whole form a steam distributing head 10.

The steam distributing head 10 connected to the associated vent pipe 11 as aforementioned is arranged such that the steam distributing head 10 is immersed in the water pool in the suppression chamber 102. In the figure, the numeral 21 designates a liquid level of the water pool.

Generally, the openings 19 formed in the side wall of the tubular body 13 are circular in shape. However, the invention is not limited to this shape of the openings 19, and the openings 19 may be of any suitable shape, such as square, or may be in the form of slits. However, when one considers the effects of spread of the steam in the water pool achieved by the edge of each opening 19, one finds that venting of the steam takes place through only one portion of the edge, with the major portion of the edge not effecting to the spread of the steam in the water pool. Thus, a circular opening which has a minimum wetted periphery per unit area is the most effective opening 19.

The improvements provided by the present invention will be summarized in Table 1 which appears on page 8 of the specification.

Table 1 shows a source fluid of action (column b), unfavorable actions of the fluid (column c) and the structures affected by the loads (column d) with respect to the loads (column a) which are produced by the phenomena described in paragraphs (I) and (V) above when an accident occurs. There are also shown load reduction ratios or energy reduction ratios (column e) which are achieved by the vent exit device in accordance with the present invention.

The improvements provided by the invention will now be described on the basis of the data contained in Table 1 by referring to FIG. 3.

Figure 3:
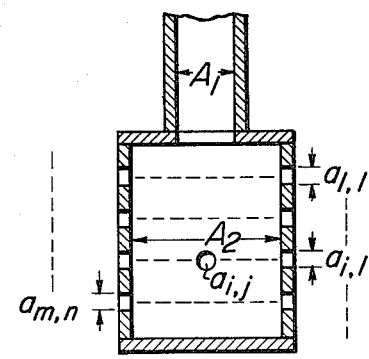
FIG. 3 is a view in explanation of the manner in which formulae for determining the size of the vent exit device in accordance with the invention are obtained.

In FIG. 3, if the cross-sectional area of the bore of the vent pipe 11 is denoted by $A_1$, the cross-sectional area of the bore of the tubular body 13 is denoted by $A_2$, and the cross-sectional area of each opening 19 arranged in m columns and n rows in the side wall of the tubular member 13 is denoted by a, the expansile ratio $N_1$ can be defined as $$N_1 = (A_2/A_1)$$

Also, the area ratio $N_2$ can be defined as $$N_2 = \frac{\sum_{i=1, j=1}^{m, n} a_{ij}}{A_2}$$

TABLE 1

| | Kinds of load occurred (a) | Source fluid of action (b) | Unfavorable actions (c) | Structures affected (d) | Load reduction ratio (e) |
|---|---|---|---|---|---|
| (I) | Water jet force | Water in vent pipe | Ejection of the water | The floor of the suppression chamber | $N_1^{-2}$ |
| (II) | Vent lateral load | Compressed air in vent pipe | Pressuring by the air | The vent pipe | $N_1^{-1} \cdot N_2^{-1}$ |
| (III) | Bubble formation pressure spike | Compressed air in vent pipe | Pressuring by the air | The floor and the wall of the suppression chamber | $N_1^{-1}$ |
| (IV) | Pool swell impact | Compressed air in vent pipe | Suppression & expansion of the air | Upper structure in the suppression chamber | $N_1^{-1} \cdot N_2^{-1}$ |
| (V) | Steam condensing vibration | Vented steam | The bubble growing & condensing | The vent pipe | $N_1^{-1} \cdot N_2^{-1}$ |

By studying the relation between $N_1$ and $N_2$ on one hand and the various loads set forth in Table 1, it has been ascertained by us that the load reduction ratios (column e) are as shown in the Table.

More specifically, the load reduction ratio for the water jet force is $N^{-2}$ because this force is related to the ejection of the water through the opening and is in inverse proportion to the velocity of flow the load reduction ratio for the vent lateral load, pool swell impact and steam condensing vibration is $N_1^{-1} \cdot N_2^{-1}$ because they are in inverse proportion to the total pressure; and the load reduction ratio for the bubble formation pressure spike is $N_1^{-1}$ because this is in inverse proportion to a static pressure, with $N_2$ having nothing to do with it because $N_2$ is a dynamic pressure.

A further study conducted by us on the specific ranges of $N_1$ and $N_2$ has produced the following results.

Of the loads of (I), (III) and (V) which act with a high degree of intensity in common with all the aforementioned types of accidents, the bubble formation pressure spike of (III) alone depends solely on $N_1$ for its damping effect. It is necessary to reduce to at least less than half the value of the bubble formation pressure spike. To this end, it has been found that 2 is a proper numeral as the minimum value of $N_1$. Also, in view of the fact that a difficulty is experienced in assembling the vent exit device if the diameter of the tubular body 13 is over three times as great as the diameter of the tubular body of the prior art, it has been found that the diameter of the tubular body 13 is preferably three times as great as that of the vent pipe 11 or the upper limit of the value of $N_1$ is preferably 9. In contrast, $N_2$ should be greater than or equal to 1. It is also noted that it has been found that a particularly advantageous arrangement is formed when a venting device is provided with values for $N_1$ and $N_2$ of 9 and 4, respectively.

On the other hand, when an accident occurs, the air vented from the vent pipe 11 at initial stages is vented with relatively less ease than the steam that follows the water because of the high coefficient of viscosity of the water. In order to suppress a rise in the liquid level of the water pool which would otherwise be caused by the air, the openings 19 disposed nearer to the vent pipe 11 are formed such that their cross-sectional area is greater than the cross-sectional area of the openings remote from the vent pipe 11. In initial stages, the air is first vented to the water pool through the openings of the larger cross-sectional area. It is proper that the openings 19 disposed in a portion of the tubular body 13 opposite to the portion thereof which is connected to the vent pipe 11, through which the steam is mainly vented, should have a relatively small cross-sectional area.

In order to prevent the air bubbles vented through the openings 19 from uniting into larger bubbles, it is necessary that the spacing between the adjacent openings 19 should be about twice the equilibrium diameter of the openings 19.

Moreover, in order to keep the venting of air bubbles uniform and to suppress the exciting force of the vent exit device which would other wise accelerate the vibration of the vent exit device, it is desirable that the openings 19 be disposed symmetrically with respect to the center axis of the vent exit device.

In the present invention, with the expansile ratio $N=9:1$ and the area ratio $N_2=4:1$ as aforementioned, it is possible to reduce steam condensing vibration to 1/36 on the basis of the relationship in the last column of Table 1.

More specifically, the present invention shows that the effect of satisfactorily reducing steam condensing vibration can be achieved by drastically increasing the area of the flow passage through the second pipe as compared with that of the flow passage through the first pipe so as to lower the pressure and velocity of steam of high pressure and high velocity to the lowest possible levels when the steam is released into a pressure suppression pool at the time of an accident, and also by setting the total cross-sectional area of all the holes in the side wall of the second pipe at the same level as or at a higher level than the cross-sectional area of the second pipe so as to increase the area through which the steam is released into the pool.

On the other hand, in the prior art, restrictions have been placed on the flow of steam passing out of the holes in venting devices by setting the total cross-sectional area of all the holes in the side wall of the second pipe at a low level as compared with the cross-sectional area of the second pipe making it impossible to achieve satisfactory results in reducing steam condensing vibration. That is, due to a throttling effect which results in prior art arrangements, it is impossible to reduce the pressure and velocity of high pressure and high velocity steam (e.g., 70 atm. and 50-200 m/sec.) to satisfactory levels, as is necessary in the present nuclear reactor environment.

From the point of view of increasing the reliability and strength of a nuclear reactor containment vessel and vent pipes, it is desirable that steam condensing vibration be reduced to 1/10 the value obtained with vent pipes of a constant inner diameter. Utilizing the preferred ratios according to this invention, this value is reduced to 1/36.

Furthermore, in the present invention, the use of the round holes permits an increase in the area of the flow passage for steam such that the velocity at which the steam is vented into a pool of water can be minimized.

Accordingly, it can be seen that the present invention provides an advantageous vent exit device for condensing steam which, while simple in structure, avoids many of the problems inherent to prior art steam venting arrangements.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In a boiling water nuclear reactor of the water moderated type having a dry well, a suppression chamber, and a vertically extending venting device extending from the dry well into the suppression chamber, for supplying steam to be condensed to said suppression chamber, the improvement comprising said venting device being formed of:

a first elongated pipe, a second pipe, the diameter of which is larger than that of said first elongated pipe, and with respect to which an expansile ratio constituted by the ratio of the bore cross-sectional area of said second pipe to that of said first pipe is from 2:1 to 9:1, an upper cover plate, secured air-tightly to one end of said second pipe and one end of said first elongated pipe, for passing steam through said first elongated pipe to the inside of said second pipe, a lower cover plate secured air-tightly to the other end of said second pipe, and a plurality of openings formed on said second pipe, and wherein an area ratio is constituted by the ratio of the total cross-sectional area of all of said openings of said second pipe to the transverse cross-sectional area of the second pipe, the product of said expansile ratio and said area ratio being equal to or greater than 10.

2. In a boiling water nuclear reactor according to claim 1, the further improvement wherein said area ratio equal 4:1.

3. In a boiling water nuclear reactor according to claim 1, the further improvement wherein said expansile ratio equals 9:1.

4. In a boiling water nuclear reactor as set forth in claim 1, the further improvement wherein said openings are round holes.

5. In a boiling water nuclear reactor as set forth in claim 4, the further improvement wherein the intervals of neighboring round holes are about twice as much as the diameter of said round holes.

6. In a boiling water nuclear reactor as set forth in claim 4, the further improvement wherein said round holes are arranged symmetrically in rows around the axis of said second pipe.

7. In a boiling water nuclear reactor as set forth in claim 6, the further improvement wherein the diameter of holes which are closer to said upper cover plate, are larger than those remote from said upper cover plate.

* * * * *